US012678932B2

(12) United States Patent
Hsieh

(10) Patent No.: US 12,678,932 B2
(45) Date of Patent: Jul. 14, 2026

(54) TOOL RACK

(71) Applicant: Chih-Chien Hsieh, Taichung City (TW)

(72) Inventor: Chih-Chien Hsieh, Taichung City (TW)

( * ) Notice: Subject to any disclaimer, the term of this patent is extended or adjusted under 35 U.S.C. 154(b) by 3 days.

(21) Appl. No.: 18/914,264

(22) Filed: Oct. 14, 2024

(65) Prior Publication Data

US 2026/0102896 A1 Apr. 16, 2026

(51) Int. Cl.
*B25H 3/00* (2006.01)
*B65D 25/10* (2006.01)

(52) U.S. Cl.
CPC ........... *B25H 3/003* (2013.01); *B65D 25/105* (2013.01)

(58) Field of Classification Search
CPC ... B25H 3/00; B25H 3/02; B25H 3/04; B25H 3/06; B25H 3/003; B25H 3/021; B65D 25/105
See application file for complete search history.

(56) References Cited

U.S. PATENT DOCUMENTS 5,794,543 A * 8/1998 John .................. B65D 19/0022 108/56.1
6,048,503 A * 4/2000 Riley ........................ A61L 2/26 422/26
6,244,447 B1 * 6/2001 Frieze ....................... A61L 2/26 206/370
6,331,280 B1 * 12/2001 Wood ........................ A61L 2/26 206/268
6,436,357 B1 * 8/2002 Frieze ....................... A61L 2/26 422/292
7,246,704 B2 * 7/2007 Brunson ................ B25H 3/003 220/23.88
7,424,958 B1 * 9/2008 Eley ...................... A47F 5/0815 211/70.6
7,806,264 B1 * 10/2010 Lai ......................... B25H 3/003 206/375
8,371,444 B1 * 2/2013 Huang ................... B25H 3/003 206/374
8,505,720 B2 * 8/2013 Huang ................... B65D 85/00 206/349
9,193,063 B2 * 11/2015 Huang ...................... F16B 2/14
9,625,143 B2 * 4/2017 Hsu ........................ B25H 3/003
(Continued)

FOREIGN PATENT DOCUMENTS

AU 2014377017 A1 * 8/2016 ............... B25H 3/02
DE 102012110339 A1 * 11/2013 ........... B65D 25/105
GB 2435437 B * 5/2008 ............. B65D 77/00

*Primary Examiner* — Patrick D Hawn

(57) ABSTRACT

The present invention discloses a tool organization device for receiving an insert clip. The insert clip includes a post with a laterally formed protrusion. The tool organization device includes a plate-shaped main body with an upper side and a lower side. The distance between the upper side and the lower side is defined as a first length, while the axial length of the post is defined as a second length. The first length is at least equal to the second length. The main body contains multiple mounting holes that allow the post to be inserted from top to bottom. The main body forms multiple retention elements, each of which is positioned at the corresponding mounting hole. Each retention element acts as a stop for the protrusion as it enters each mounting hole, thereby limiting the movement of the insert clip.

5 Claims, 13 Drawing Sheets

(56) References Cited

U.S. PATENT DOCUMENTS

| | | | | |
|---|---|---|---|---|
| 9,975,237 | B2 * | 5/2018 | Norris | B25H 3/06 |
| 10,058,230 | B2 * | 8/2018 | Gobl | B65D 19/0002 |
| 10,256,011 | B2 * | 4/2019 | Rouleau | H02G 3/32 |
| 10,315,200 | B2 * | 6/2019 | Abebaw | B25H 3/06 |
| 10,618,159 | B2 * | 4/2020 | Maruzzo | B25H 3/04 |
| 11,717,954 | B2 * | 8/2023 | Heath | B25H 3/02 206/372 |
| 11,759,942 | B2 * | 9/2023 | Hohl | B25H 3/06 206/379 |
| 12,134,180 | B2 * | 11/2024 | Burns | B25H 3/02 |
| 2009/0297293 | A1 * | 12/2009 | Chang | B65D 25/105 411/427 |
| 2011/0056858 | A1 * | 3/2011 | Benczkowski | B65D 25/108 220/507 |
| 2015/0258678 | A1 * | 9/2015 | Wang | B25H 3/06 206/349 |
| 2018/0001468 | A1 * | 1/2018 | Pang | B25H 3/06 |

* cited by examiner

TOOL RACK

FIELD OF INVENTION

The present invention relates to a device for positioning tools, in particular to a tool organization device.

BACKGROUND OF THE INVENTION

Toolboxes are commonly used to store sockets, wrenches, and other hand tools. To individually position each tool for easy access, one or more tool organizers can be placed inside the toolbox.

U.S. Pat. No. 8,505,720B2 discloses a positioning pad with multiple position holes. Each hole is rectangular, having two long sides and two short sides, and is capable of receiving a holder member. The holder member consists of a flange, a holder unit, and a post unit. The holder unit is connected to one side of the flange and the post unit is connected to the other side. The holder unit is used for tool insertion, and the post unit consists of a cylindrical neck that is axially connected to a plate unit. The neck is connected to the flange, with a diameter equal to or less than the width of the short side of the position hole. The plate unit, a rectangular plate, mates with the rectangular position hole.

To insert the holder member into the positioning pad, the plate unit is vertically aligned with a position hole to match the rectangular shape of the hole. The post unit is inserted downwardly into the hole so that the plate unit exits the position hole from the bottom of the positioning pad with the flange resting on the top. The holder member is then rotated to align the long side of the plate unit with the short side of the hole. This rotation locks the holder member in place as the bottom of the positioning pad prevents the plate unit from moving back upwardly, completing the insertion process. At this time, a socket can be inserted into the holder unit for positioning.

Other positioning tools, such as an elongated plate, can also be mounted on the holder unit. Multiple elongated plates can be mounted on the holder units of different holder members to clamp and position wrenches or other tools, and the positioning tool may also take other forms. The holder unit of the holder member may be formed as a clamp shape allowing multiple holder members to clamp the tool together. Alternatively, the tool may also be equipped with the post unit for direct positioning on the positioning pad.

In order for the holder member to operate and rotate, the plate unit must extend through the bottom of the positioning pad over the position hole. The bottom of the pad acts as a stop for the plate unit. However, having the plate unit extending below the pad, the overall stability of the positioning pad may be compromised.

SUMMARY OF THE INVENTION

The main purpose of the present invention is to provide a tool organization device.

To achieve the aforementioned purpose, the present invention adopts the following technical solution:

A tool organization device, used for receiving an insert clip, the insert clip comprising a disc-shaped flange, a post, and a tool holder, wherein the disc-shaped flange connects the upper end of the post and the lower end of the tool holder, the post laterally forms a protrusion, the top end of the protrusion is positioned between the two ends of the post, and the tool holder is used to position a tool;

the tool organization device includes a plate-shaped main body with an upper side and a lower side, the upper side and the lower side are opposite each other along the thickness direction of the main body, the main body contains multiple mounting holes extending through its thickness, each mounting hole extends to both the upper side and the lower side, allowing the post to be inserted from top to bottom, the distance between the upper side and the lower side for each mounting hole is defined as a first length, while the axial length of the post is defined as a second length, the first length is at least equal to the second length, the main body forms multiple hole walls, at least every three hole walls are arranged adjacent to each other to form one mounting hole therebetween, the width of each hole wall is uniform, and the angle between any two adjacent hole walls is also equal;

the main body forms multiple retention elements, each of which is positioned at the corresponding mounting hole, each retention element is attached to one hole wall and extends toward the center of the mounting hole, each retention element forms a support surface at its bottom, the distance between each support surface and the upper side is defined as a first distance, the distance between the protrusion and the disc-shaped flange is defined as a second distance, the first distance is at most equal to the second distance, each retention element acts as a stop for the protrusion as it enters each mounting hole, thereby limiting the movement of the insert clip.

When the insert clip is positioned in any one of the mounting holes, the main body can be stably and steadily placed on a plane, thereby stably positioning the main body.

DETAILED DESCRIPTION OF THE PREFERRED EMBODIMENTS

Figure 1:
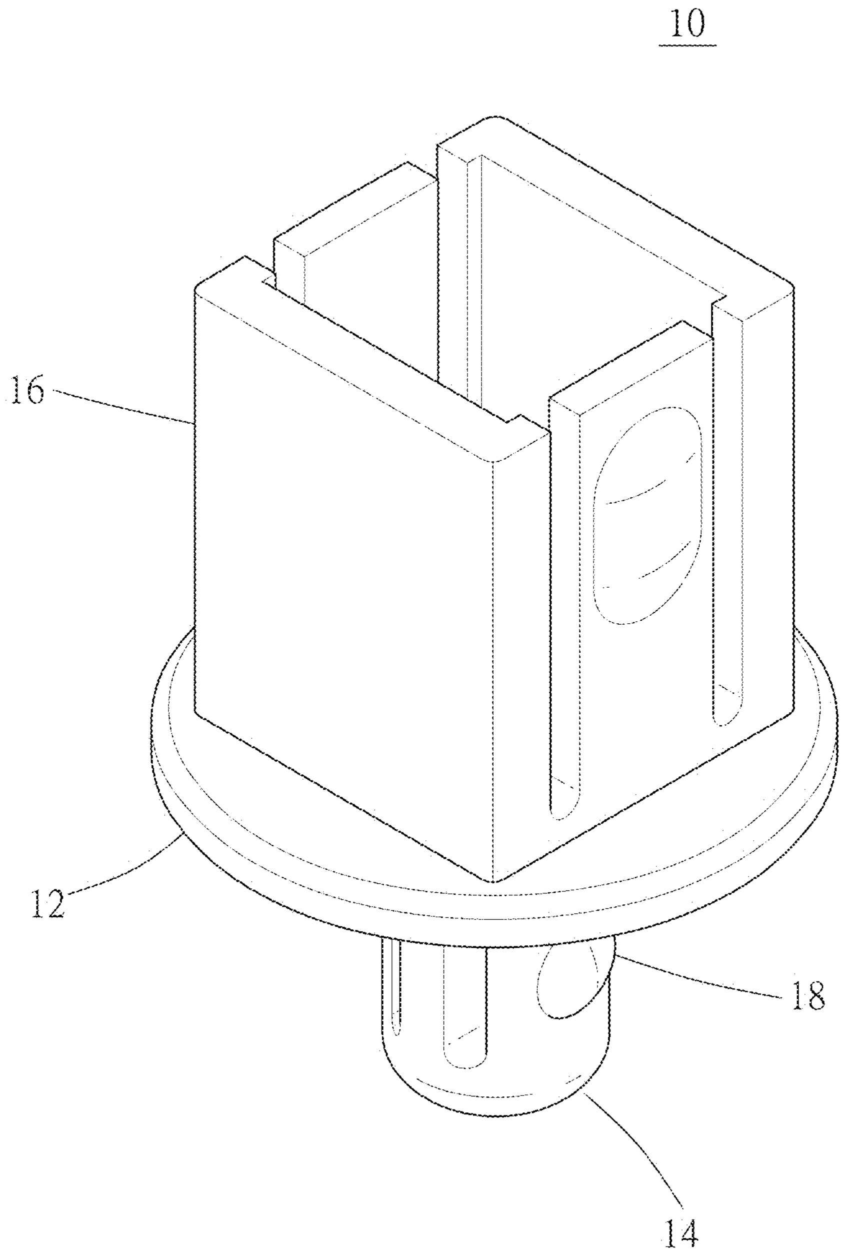
FIG. 1 is a perspective view of the insert clip applied in Embodiment 1 of the present invention.
Figure 2:
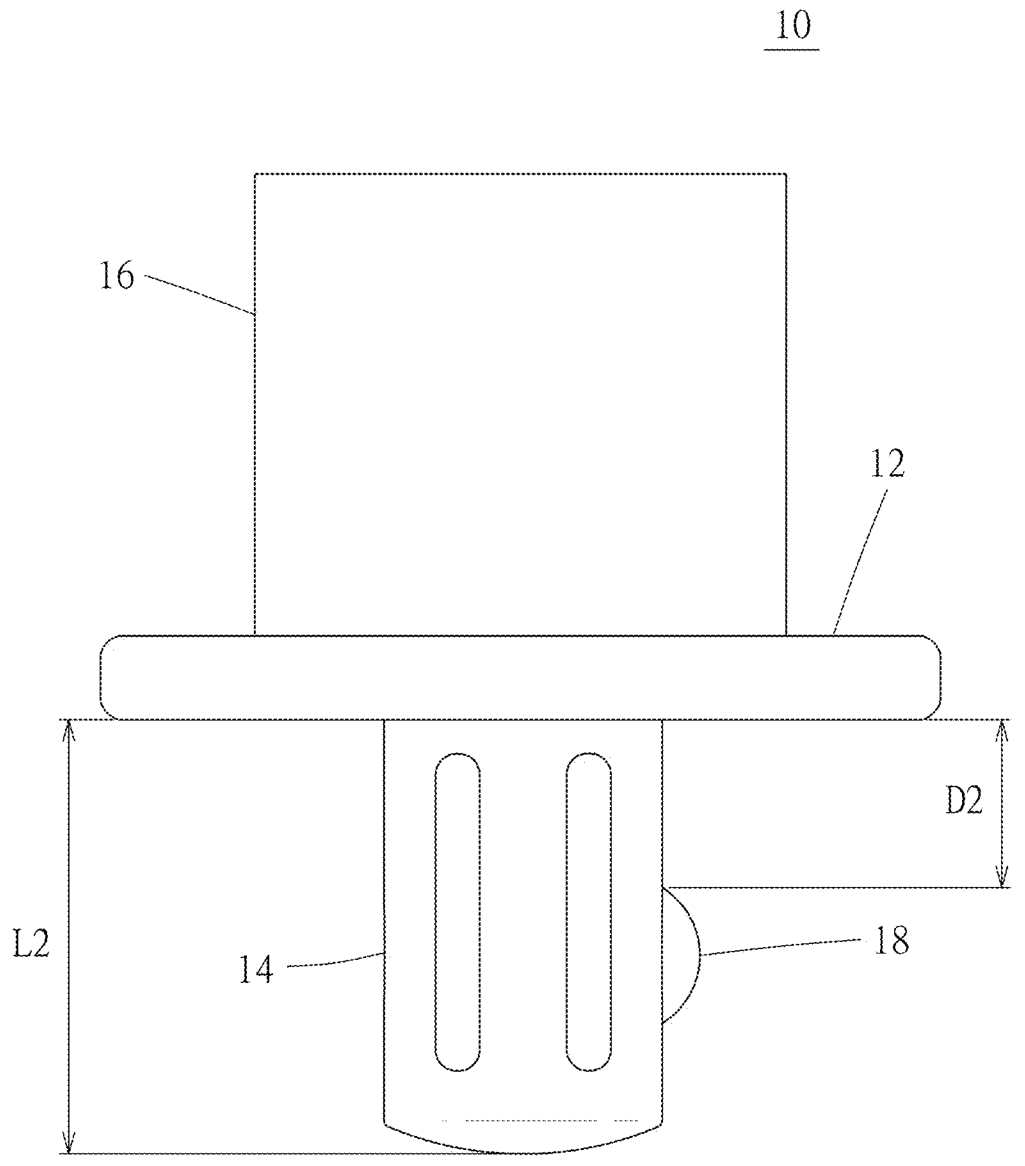
FIG. 2 is a front view of the insert clip applied in Embodiment 1 of the present invention.
Figure 3:
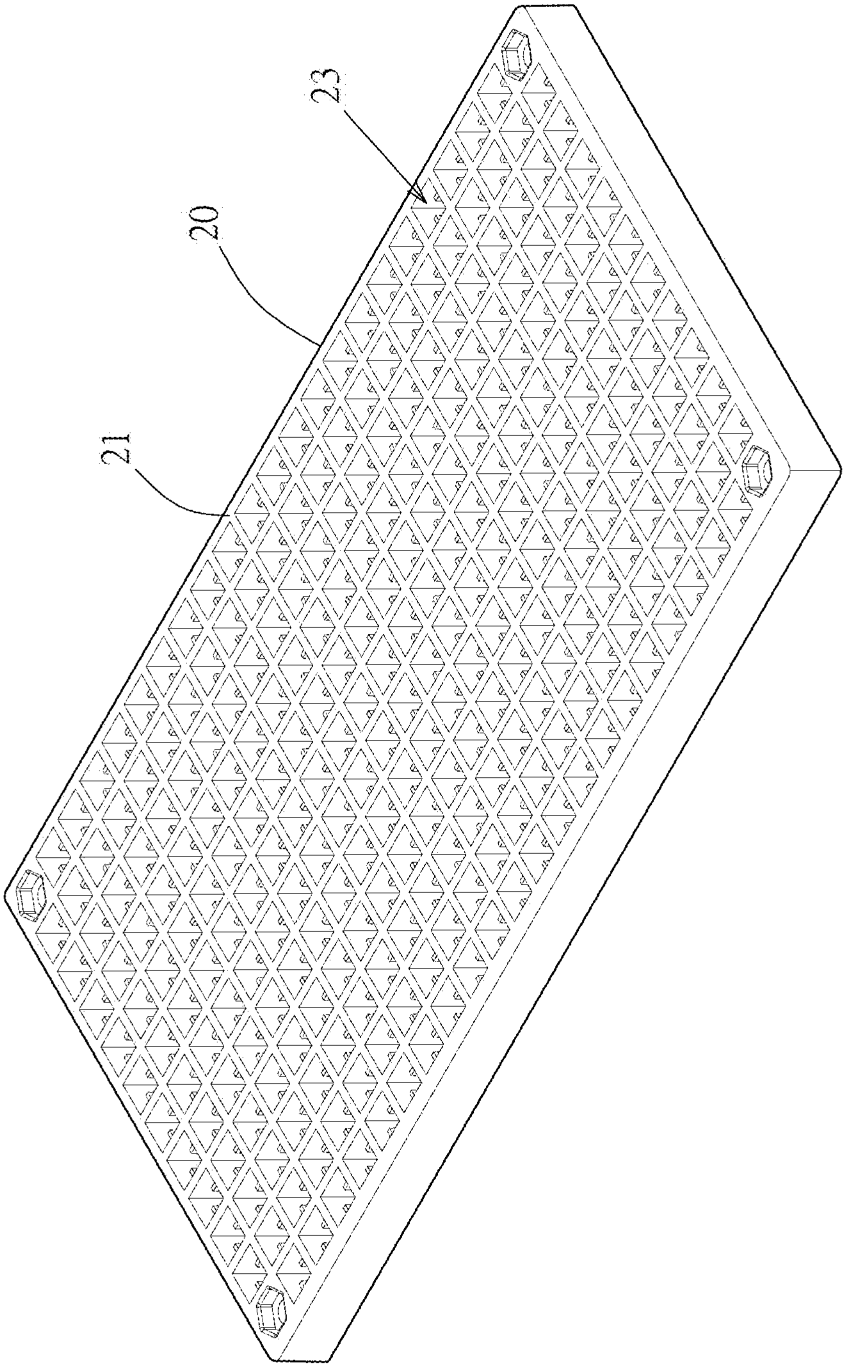
FIG. 3 is a perspective view of Embodiment 1 of the present invention.
Figure 4:
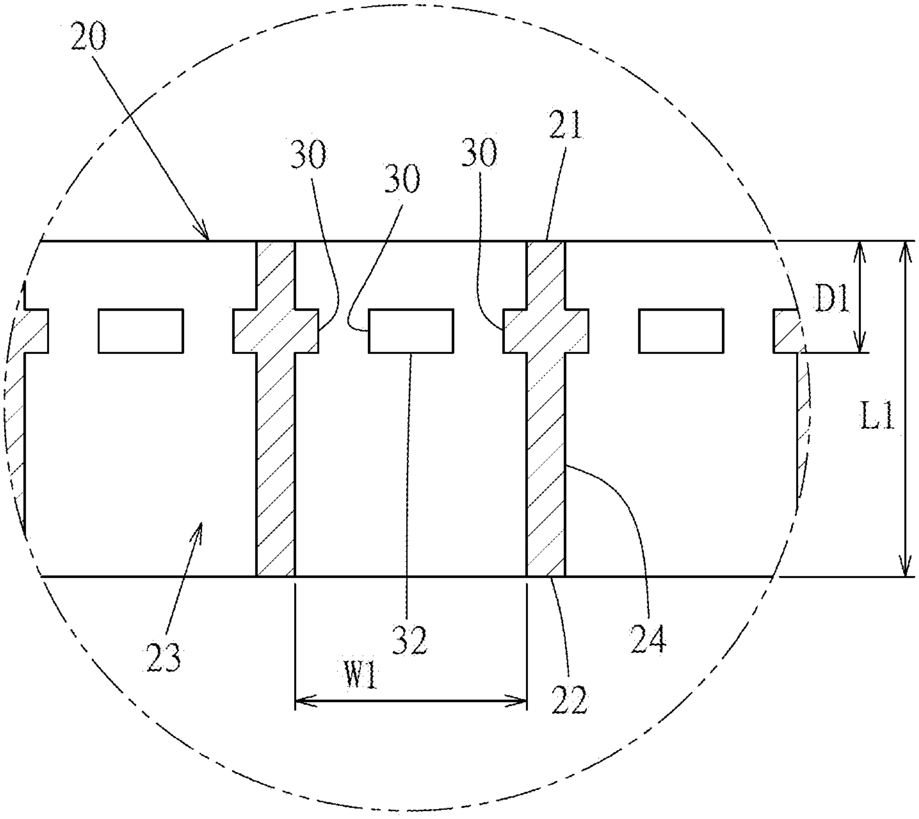
FIG. 4 is a partial sectional view of Embodiment 1 of the present invention.
Figure 5:
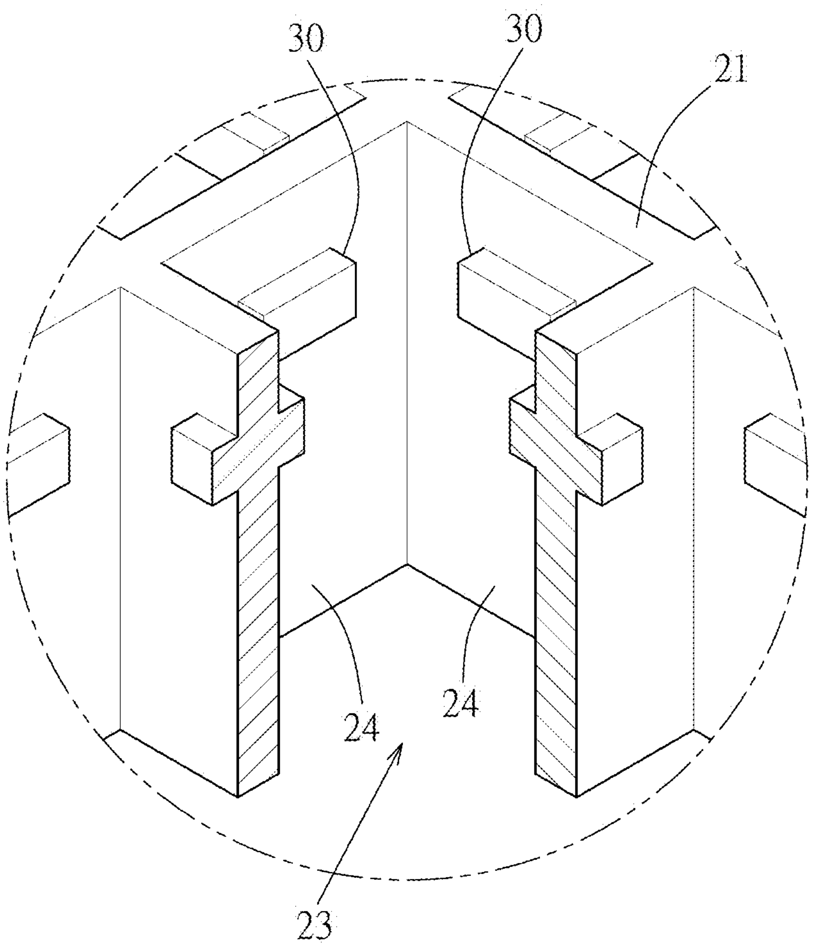
FIG. 5 is a partial perspective sectional view of Embodiment 1 of the present invention.
Figure 6:
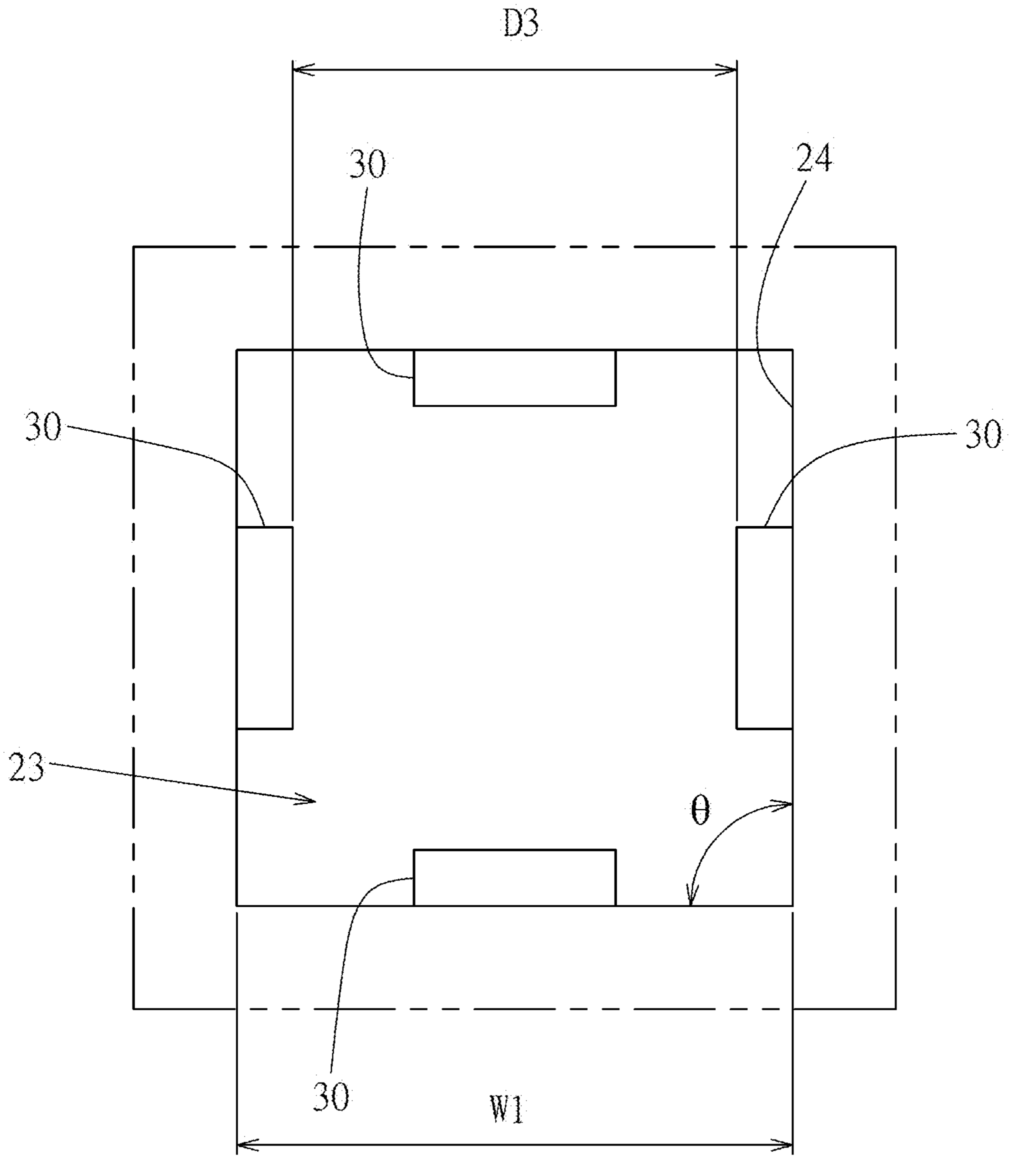
FIG. 6 is a partial top view of Embodiment 1 of the present invention.
Figure 7:
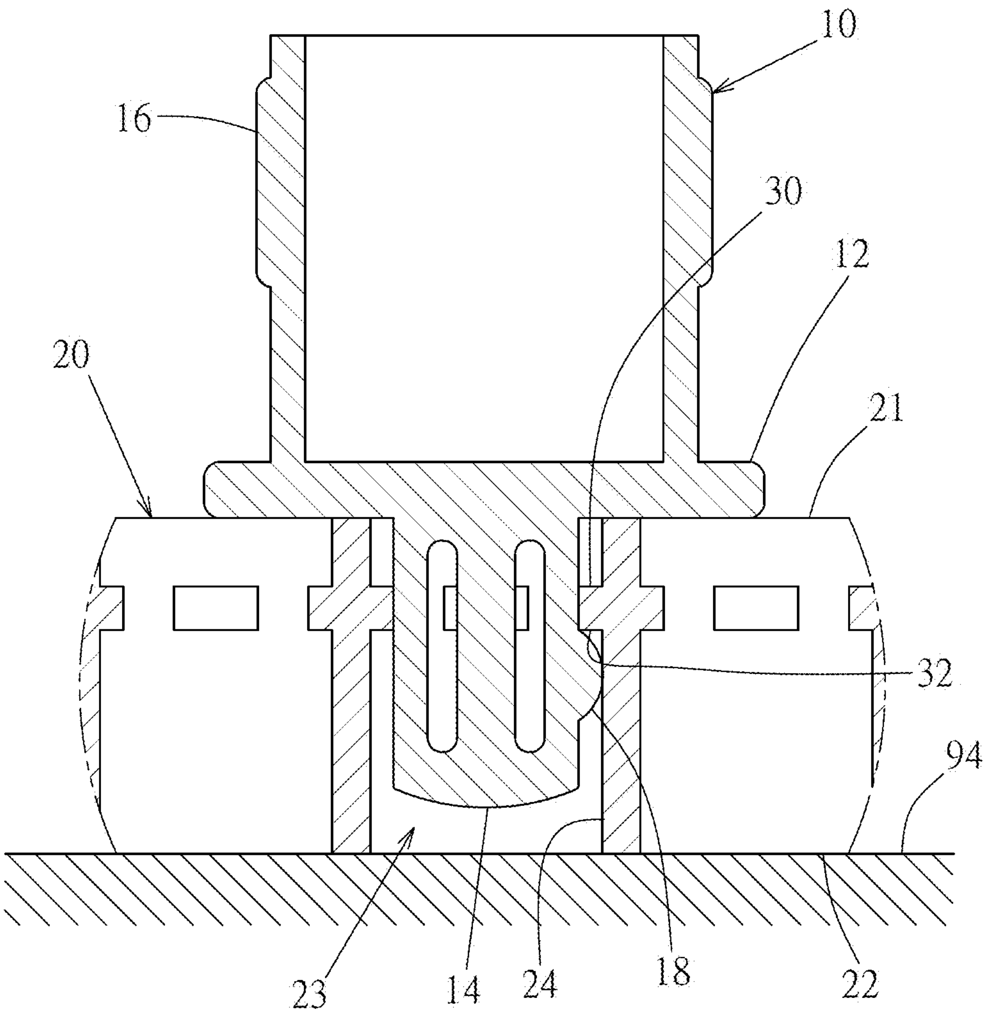
FIG. 7 is a partial sectional view schematically showing the insert clip applied in Embodiment 1 of the present invention.

As shown in FIGS. 1 to 10, the said tool organization device is designed to receive one or more insert clips 10.

Each insert clip 10 consists of a disc-shaped flange 12, a post 14, and a tool holder 16. The disc-shaped flange 12 connects the upper end of the post 14 and the lower end of the tool holder 16. The post 14 laterally forms a protrusion 18, and the top end of the protrusion 18 is positioned between the two ends of the post 14. The tool holder 16 is used to position a tool 92 and may also be incorporated as part of the tool 92 itself.

In an Embodiment 1, the tool organization device includes a plate-shaped main body 20 with an upper side 21 and a lower side 22, both preferably flat and parallel to each other. The upper and lower sides 21, 22 are positioned opposite each other along the thickness of the main body 20.

The main body 20 contains multiple mounting holes 23 that extend through its thickness. Each mounting hole 23 extends to both the upper side 21 and the lower side 22, allowing the post 14 to be inserted from top to bottom. The distance between the upper side 21 and the lower side 22 for each mounting hole 23 is defined as a first length L1, while the axial length of the post 14 is defined as a second length L2. The first length L1 is at least equal to, and preferably slightly greater than, the second length L2.

The main body 20 forms multiple hole walls 24. Every four hole walls 24 are arranged adjacent to each other to form one mounting hole 23 therebetween, making each mounting hole 23 radially square-shaped. The radial shape of the mounting holes 23 can also be changed to other polygonal shapes, such as triangular or hexagonal. In the present invention, at least three adjacent hole walls 24 form one mounting hole 23 therebetween.

The width W1 of each hole wall 24 is uniform, and the angle θ between any two adjacent hole walls 24 is also equal.

The main body 20 forms multiple retention elements 30, each of which is positioned at the corresponding mounting hole 23. Each retention element 30 is attached to one hole wall 24 and extends toward the center of the mounting hole 23. A support surface 32 is formed at the bottom of each retention element 30 and is connected to the hole wall 24. The distance between each support surface 32 and the upper side 21 is defined as a first distance D1. The distance between the protrusion 18 and the disc-shaped flange 12 is defined as a second distance D2. The first distance D1 is at most equal to, and preferably equal to, the second distance D2. Each retention element 30 acts as a stop for the protrusion 18 as it enters the mounting hole 23, thereby limiting the movement of the insert clip 10.

In Embodiment 1, one retention element 30 is preferably formed on each hole wall 24 at the radial perimeter of each mounting hole 23. When the post 14 is inserted into a selected mounting hole 23 from the upper side 21, each perimeter retention element 30 acts as a stop for the protrusion 18 positioned thereunder in the direction toward the upper side 21, causing the protrusion 18 to abut against the support surface 32. This design enhances the ease of positioning the insert clip 10 on the main body 20.

The number of retention elements 30 in each mounting hole 23 can be varied as needed, but each mounting hole 23 should have at least one retention element 30.

To position the insert clip 10 on the main body 20, place the insert clip 10 above the main body 20 with the post 14 under the disc-shaped flange 12. Align the insert clip 10 so that the post 14 is inserted through the upper side 21 into the selected mounting hole 23. At this point, the protrusion 18 can face any hole wall 24. Utilizing the protrusion 18, the post 14, or the main body 20 providing the material elasticity of the hole wall 24, the protrusion 18 can therefore move under the support surface 32. The support surface 32 then limits the movement of the protrusion 18, preventing the post 14 from moving upwardly and exiting the mounting hole 23, thereby securing the insert clip 10 in place.

The drawings illustrate that the post 14 is preferably a hollow structure capable of radial elastic deformation. During insertion of the post 14 into the selected mounting hole 23, the post 14 can compress and deform radially. This elastic deformation and recovery characteristic of the post 14 allows the protrusion 18 to easily move under the retention element 30. However, the post 14 is not limited to this hollow deformable structure. The specific construction of the post 14 depicted in the drawings should not be considered a limitation on the scope of the tool organizer of the present invention.

Figure 8:
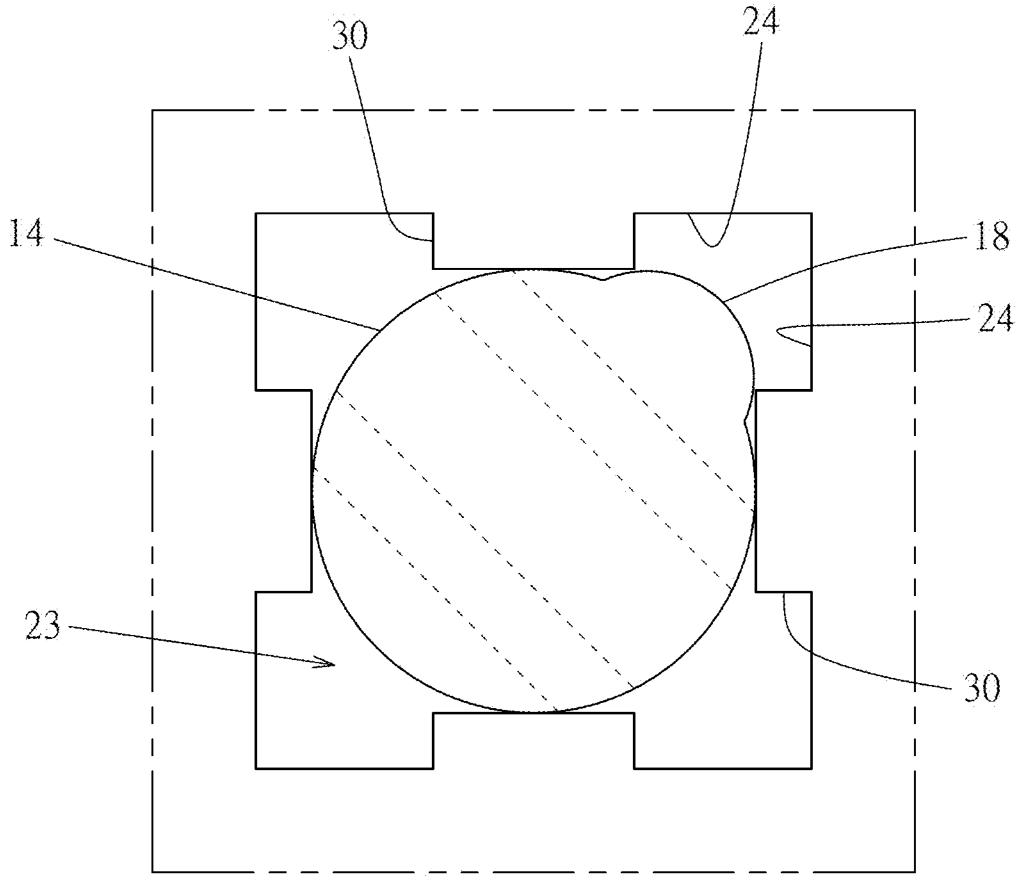
FIG. 8 is a partial bottom view (I) showing the insert clip applied in Embodiment 1 of the present invention.
Figure 9:
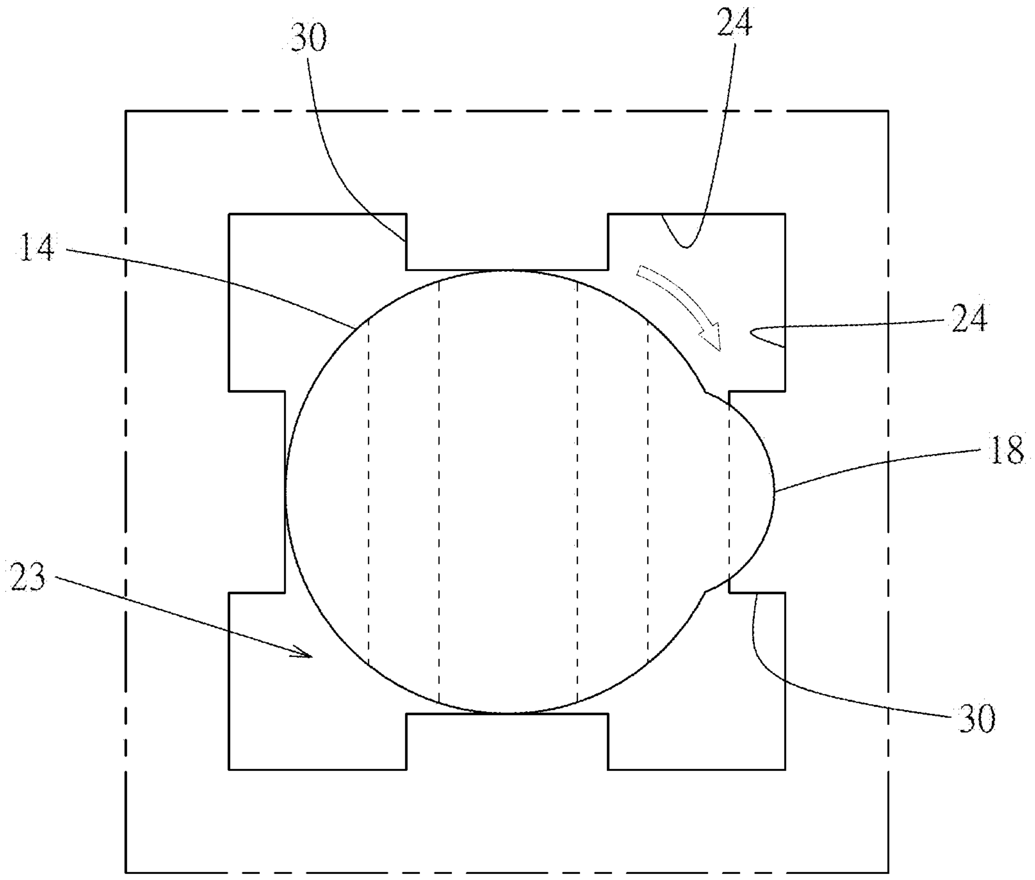
FIG. 9 is a partial bottom view (II) showing the insert clip applied in Embodiment 1 of the present invention.

To position the insert clip 10 in the selected mounting hole 23, the operation shown in FIG. 8 can be followed. First, the protrusion 18 is aligned with the junction of the two hole walls 24 so that the protrusion 18 can more easily enter the mounting hole 23 along with the post 14 until the disc-shaped flange 12 contacts the upper side 21. At this point, the protrusion 18 is positioned between the retention element 30 and the lower side 22 in the thickness direction of the main body 20. Then, as shown in FIG. 9, the insert clip 10 is rotated so that the protrusion 18 moves under one of the retention elements 30. The retention element 30 limits further movement of the protrusion 18, thereby completing the positioning of the insert clip 10.

To remove the insert clip 10 from the main body 20, simply pull the insert clip 10 upwardly. The material elasticity of the protrusion 18, the post 14, or the main body 20 will allow the protrusion 18 to pass upwardly over the retention element 30, allowing the post 14 to exit the mounting hole 23 through the upper side 21. Alternatively, the insert clip 10 may be rotated so that the protrusion 18 is away from below the retention element 30 and toward the junction of the two hole walls 24 before being pulled upwardly, allowing the post 14 to exit the mounting hole 23 through the upper side 21.

Since the first length L1 is at least equal to the second length L2, the bottom of the post 14 will not extend beyond the lower side 22 to the underside of the main body 20. When the first distance D1 is equal to the second distance D2, the disc-shaped flange 12 abuts the upper side 21.

The spatial configuration of the mounting hole 23 and the support surface 32 with respect to the post 14 and the protrusion 18 ensures that when the insert clip 10 is positioned in any selected mounting hole 23, the post 14 does not extend through the lower side 22 to the underside of the main body 20. This allows the main body 20 to be stably positioned on a flat surface 94, such as a workbench (not shown) or the bottom surface of a toolbox storage compartment (not shown), thereby ensuring stable positioning of the main body 20.

Compared to the positioning pad disclosed in U.S. Pat. No. 8,505,720B2, the main body 20 does not require structures on the lower side 22 for limiting or positioning the insert clip 10, resulting in a more streamlined overall construction.

The mounting hole 23 can receive the insertion and positioning of posts 14 with various radial shapes, including circular, triangular, or even-sided regular polygons. These even-sided regular polygons include, but are not limited to, square and hexagonal shapes. In contrast, the position holes of the prior art positioning pad can only accept post units that conform to specific shapes and dimensions, giving the Embodiment 1 a broader range of applications.

The mounting holes 23 are preferably arranged in a matrix distribution, with each hole wall 24 extending to both the upper side 21 and the lower side 22.

The shortest distance between two retention elements 30 on radially opposite sides of each mounting hole 23 is defined as a third distance D3. The radial width of the post 14 is defined as a second width W2. Preferably, the third distance D3 is compatible with the second width W2. In this context, "compatible" means that the third distance D3 is equal to or slightly greater than the second width W2.

Figure 10:
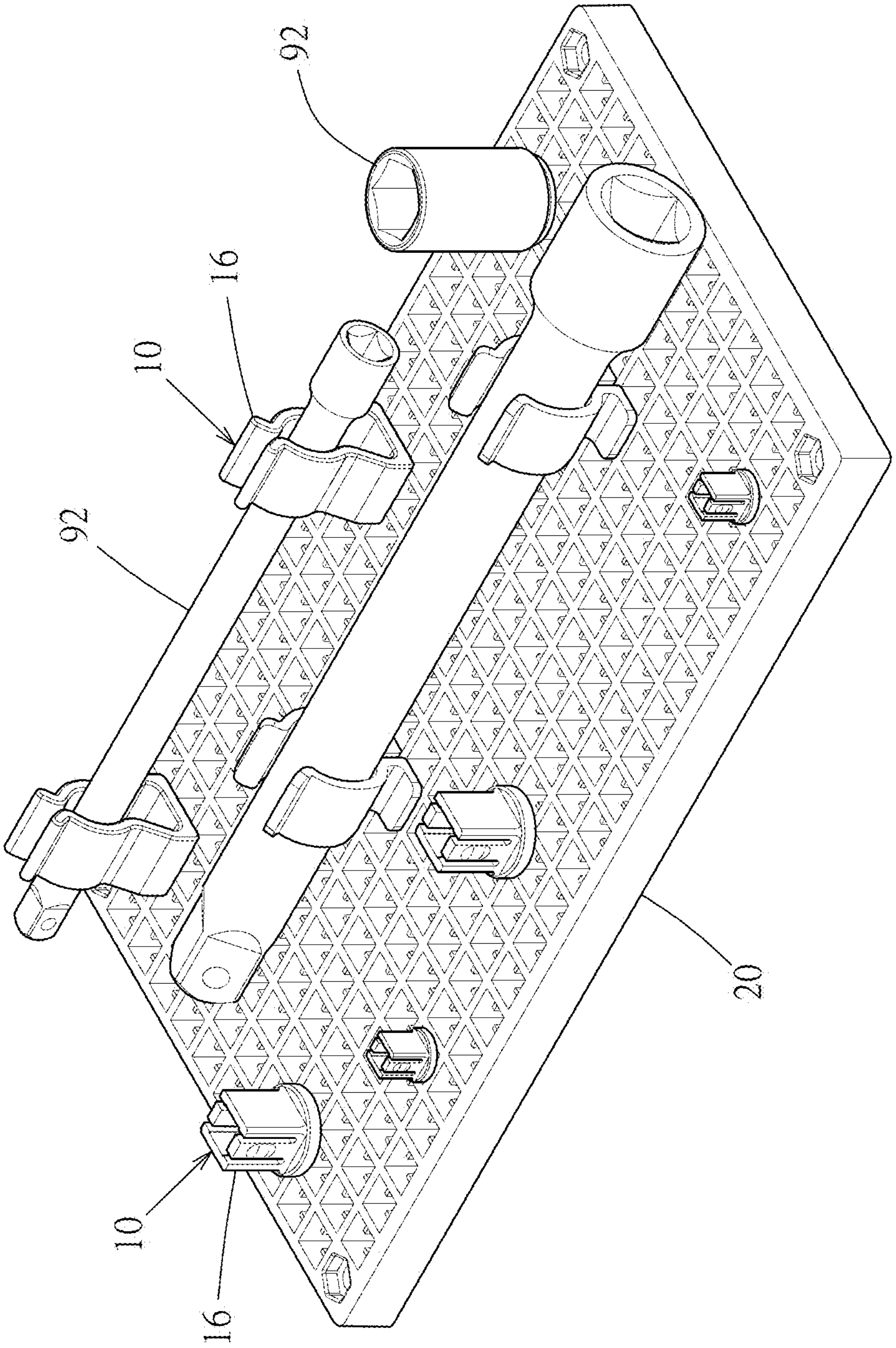
FIG. 10 is a perspective view showing the use state of Embodiment 1 of the present invention.

As shown in FIG. 10, the main body 20 can receive the multiple insert clips 10. The tool holder 16 of each insert clip 10 may vary based on the intended use of the tool 92 it is designed to position, and is not limited to the configurations shown in the drawings.

Figure 11:
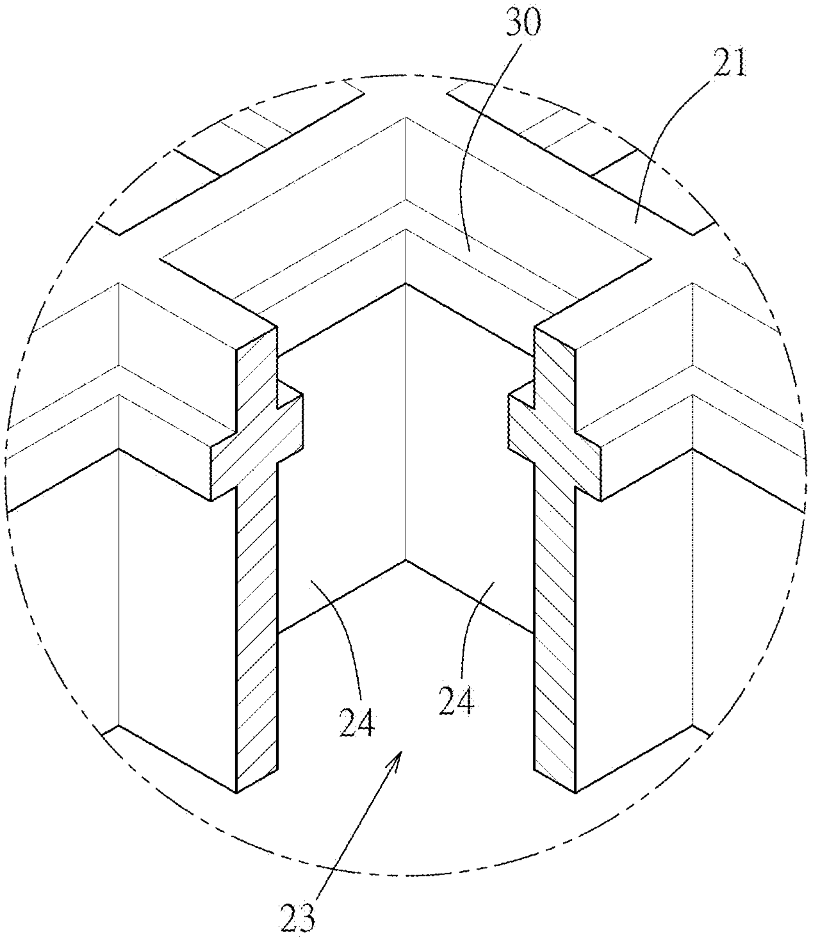
FIG. 11 is a partial perspective sectional view of Embodiment 2 of the present invention.

As shown in FIG. 11, the main difference between Embodiment 2 and Embodiment 1 is that the main body 20 forms a single retention element 30 for each mounting hole 23. Each retention element 30 is ring-shaped and forms a ring-shaped support surface 32, which is connected to the hole wall 24 at the radial perimeter of the mounting hole 23. The shortest distance between radially opposite sides of the inner edge of each ring-shaped retention element 30 is defined as a third distance D3. The third distance D3 is compatible with the second width W2.

Figure 12:
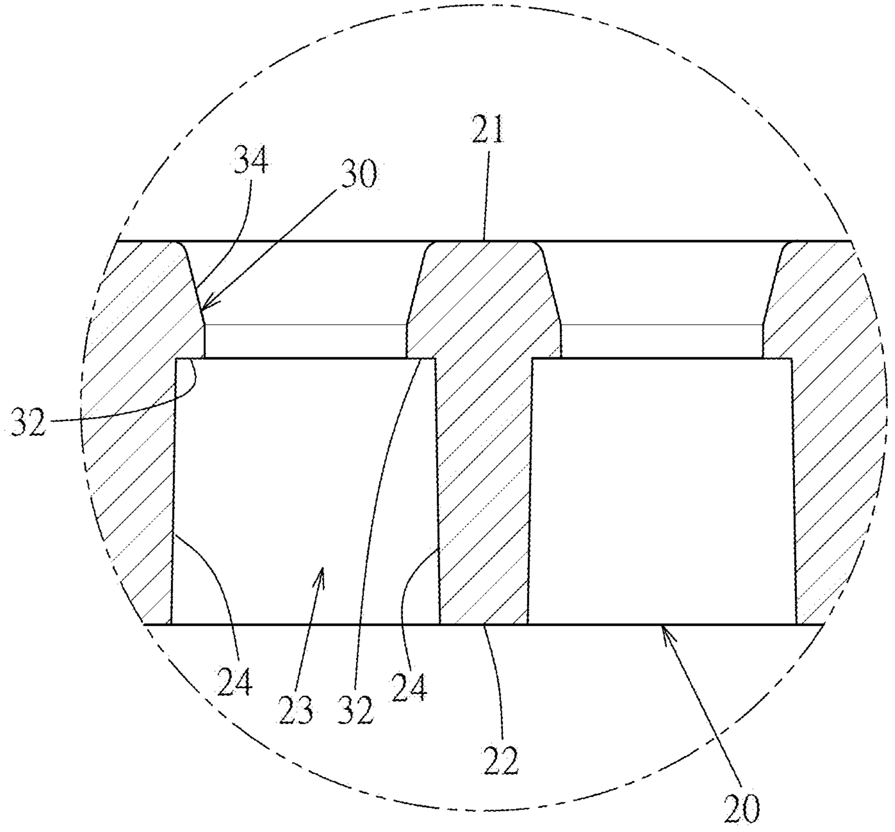
FIG. 12 is a partial sectional view of Embodiment 3 of the present invention.
Figure 13:
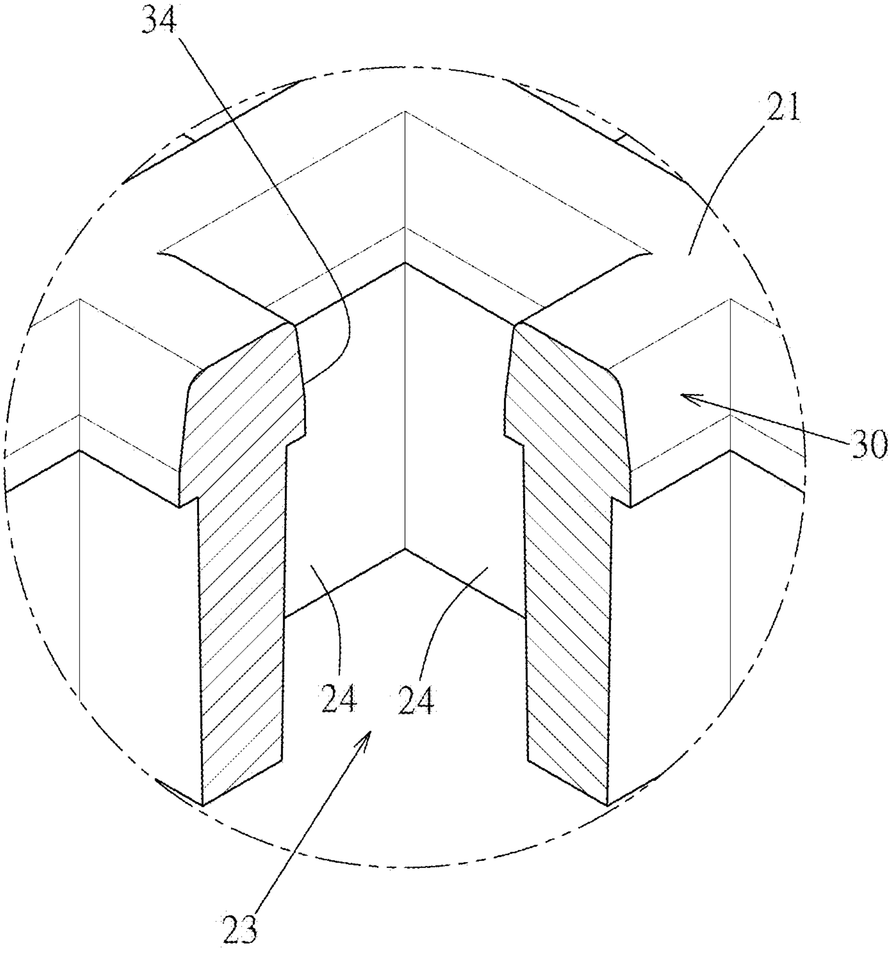
FIG. 13 is a partial perspective sectional view of Embodiment 3 of the present invention.

As shown in FIGS. 12 and 13, the main difference between Embodiment 3 and Embodiment 2 is that each retention element 30 forms a ring-shaped guiding surface 34. This guiding surface 34 is connected to the side of the support surface 32 opposite the hole wall 24 and extends toward the upper side 21, guiding the post 14 and the protrusion 18 through the ring-shaped retention element 30 from top to bottom.

What is claimed is:

1. A tool organization device, used for receiving an insert clip, the insert clip comprising a disc-shaped flange, a post, and a tool holder, wherein the disc-shaped flange connects an upper end of the post and a lower end of the tool holder, the post having a lateral protrusion, a top end of the protrusion positioned between the two ends of the post, and the tool holder is used to position a tool;

wherein the tool organization device comprises:

a plate-shaped main body with an upper side and a lower side, the upper side and the lower side are opposite each other along a thickness direction of the main body, the main body comprising multiple mounting holes extending through its thickness, each mounting hole extending to both the upper side and the lower side, allowing the post of the insert clip to be inserted from top to bottom, a distance between the upper side and the lower side for each mounting hole defined as a first length, while an axial length of the post is defined as a second length, the first length being at least equal to the second length, a centerline of each mounting hole extending along the first length at a center of the mounting hole, the main body comprising multiple hole walls, at least every three hole walls arranged adjacent to each other to form one of the multiple mounting holes therebetween, a width of each hole wall being uniform, and an angle between any two adjacent hole walls also being equal;

the main body further comprises multiple retention elements, each of which is positioned in a corresponding mounting hole, each retention element is attached to a hole wall and extends from the hole wall toward the centerline of the mounting hole, wherein a distance from the hole wall to the centerline is greater than a distance from the retention element to the centerline, each retention element having a support surface at its bottom, a distance between each support surface and the upper side is defined as a first distance, a distance between the protrusion of the insert clip and the disc-shaped flange of the insert clip is defined as a second distance, the first distance is at most equal to the second distance, each retention element configured as a stop for the protrusion as the protrusion exits each mounting hole, thereby limiting movement of the insert clip;

wherein for each mounting hole, at a first rotational position the protrusion can move past the retention element when being inserted into the mounting hole, and at a second rotational position the protrusion is positioned under the support surface of the retention element to prevent removal of the insert clip from the mounting hole.

2. The tool organization device according to claim 1, wherein the main body comprises at least one retention element for each mounting hole.

3. The tool organization device according to claim 2, wherein the retention element for each mounting hole is ring-shaped, and each retention element forms a ring-shaped support surface connecting to each hole wall along a radial perimeter of the mounting hole.

4. The tool organization device according to claim 3, wherein each retention element forms a ring-shaped guiding surface, the guiding surface is connected to a side of the support surface opposite the hole wall and extends toward the upper side.

5. The tool organization device according to claim 3, wherein a shortest distance between radially opposite sides of an inner edge of each ring-shaped retention element is defined as a third distance, a radial width of the post is defined as a second width, and the third distance is compatible with the second width.

* * * * *